United States Patent
Eguchi et al.

(10) Patent No.: US 8,189,921 B2
(45) Date of Patent: May 29, 2012

(54) CHARACTER RECOGNITION DEVICE

(75) Inventors: Shinichi Eguchi, Inagi (JP); Hajime Kawashima, Inagi (JP); Kouichi Kanamoto, Inagi (JP); Shohei Hasegawa, Inagi (JP); Katsutoshi Kobara, Inagi (JP); Maki Yabuki, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 677 days.

(21) Appl. No.: 12/414,229

(22) Filed: Mar. 30, 2009

(65) Prior Publication Data

US 2009/0245627 A1    Oct. 1, 2009

(30) Foreign Application Priority Data

Mar. 31, 2008   (JP) ................. 2008-089118

(51) Int. Cl.
  *G06K 9/00* (2006.01)
  *G06K 9/18* (2006.01)

(52) U.S. Cl. ........ 382/182; 382/162; 382/163; 382/165; 382/177; 382/190

(58) Field of Classification Search .................. 382/162, 382/163, 165, 177, 182, 190, 202
See application file for complete search history.

(56) References Cited

U.S. PATENT DOCUMENTS

| | | | |
|---|---|---|---|
| 6,035,059 A | 3/2000 | Kurosawa et al. | |
| 2002/0025072 A1 | 2/2002 | Yamaai | |
| 2002/0172422 A1 | 11/2002 | Nishiwaki | |
| 2003/0002062 A1 | 1/2003 | Ikeda | |
| 2005/0100212 A1 | 5/2005 | Eguchi et al. | |
| 2005/0201620 A1 | 9/2005 | Kanamoto et al. | |
| 2008/0013833 A1 | 1/2008 | Alexander | |

FOREIGN PATENT DOCUMENTS

| | | |
|---|---|---|
| EP | 1 510 962 A1 | 3/2005 |
| EP | 1 574 987 A2 | 9/2005 |
| JP | A 57-111679 | 7/1982 |
| JP | A 61-253587 | 11/1986 |
| JP | A 62-78690 | 4/1987 |
| JP | A 2-204879 | 8/1990 |
| JP | A 6-4705 | 1/1994 |
| JP | A 6-111057 | 4/1994 |
| JP | A 6-266887 | 9/1994 |
| JP | 9-16714 | 1/1997 |
| JP | A 10-162102 | 6/1998 |
| JP | A 11-66228 | 3/1999 |
| JP | 2000-172782 | 6/2000 |
| JP | A 2000-207490 | 7/2000 |
| JP | A 2001-236464 | 8/2001 |

(Continued)

OTHER PUBLICATIONS

Japanese office action issued in corresponding Japanese App. No. 2008-089118, dated Sep. 13, 2011 (with partial English translation).

(Continued)

*Primary Examiner* — John Strege
(74) *Attorney, Agent, or Firm* — Greer Burns & Crain, Ltd.

(57) ABSTRACT

The present invention firstly roughly classifies an analysis range specified by the operator in the color image data of a form into background, a character frame and a character, precisely specifies a character frame on the basis of the classification result, eliminates the character from the color image data from which the background is eliminated and recognizes the remaining character.

3 Claims, 16 Drawing Sheets

| | FOREIGN PATENT DOCUMENTS | |
|---|---|---|
| JP | 2003-30585 | 1/2003 |
| JP | 2004-318588 | 11/2004 |
| JP | A 2005-108062 | 4/2005 |
| JP | 2005-258683 | 9/2005 |
| JP | B2 3705216 | 10/2005 |
| JP | B2 3720078 | 11/2005 |
| JP | A 2006-92345 | 4/2006 |
| JP | B2 3995185 | 10/2007 |

OTHER PUBLICATIONS

Alessandro L. Koerich, et al., "Automatic Extraction of Filled Information From Bankchecks," *Systems, Man, and* Cybernetics, 1997, *Computational Cybernetics and Simulation*, 1997; IEEE International Conference on Orlando, FL, USA, New York, NY, USA, vol. 3,, pp. 2151-2156, Oct. 12, 1997.

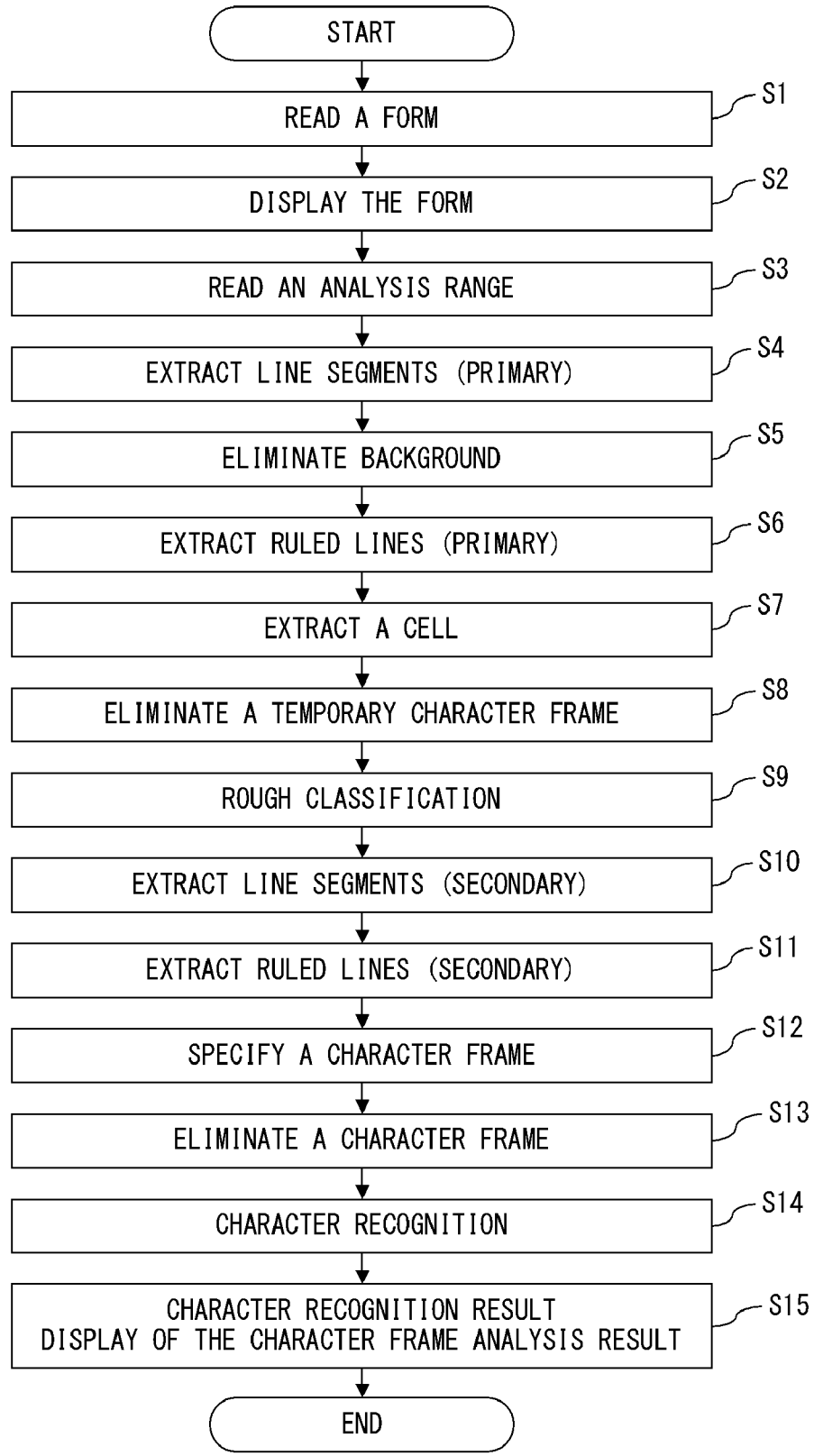
F I G. 2

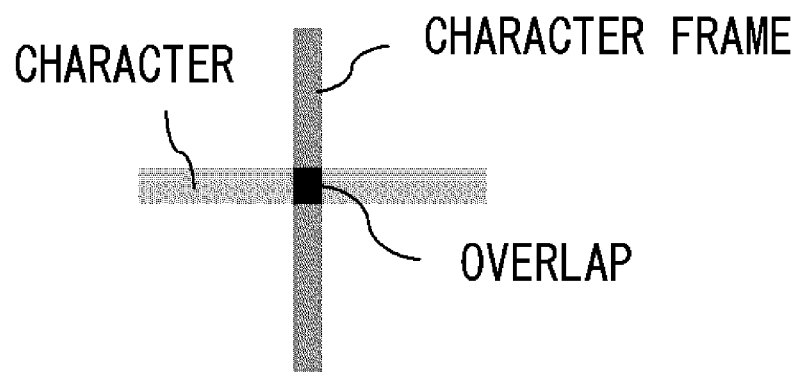
F I G. 4

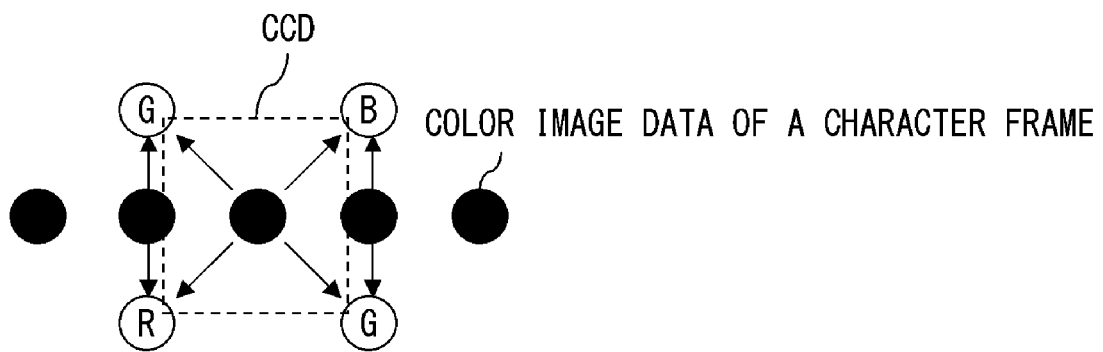
F I G. 6

F I G. 8 A 
F I G. 8 B 
F I G. 8 C 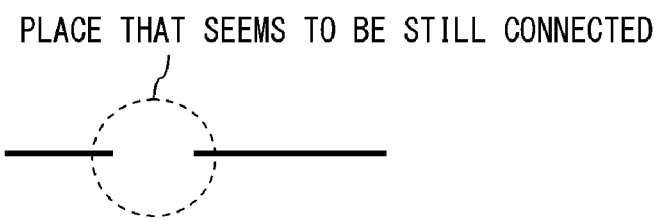
F I G. 8 D 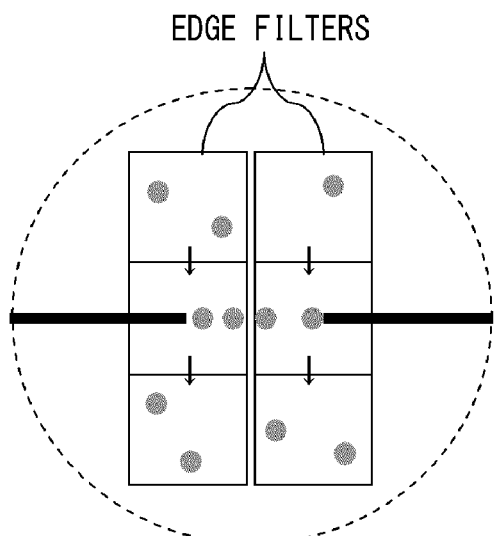
F I G. 8 E 

F I G. 9 A 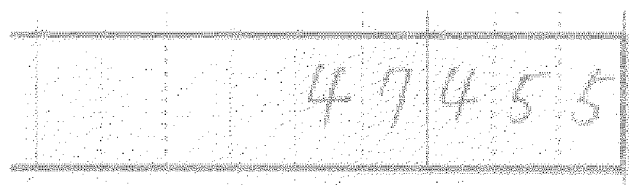
F I G. 9 B 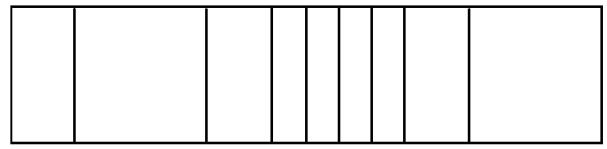
F I G. 9 C 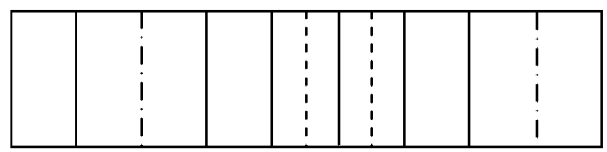
F I G. 9 D 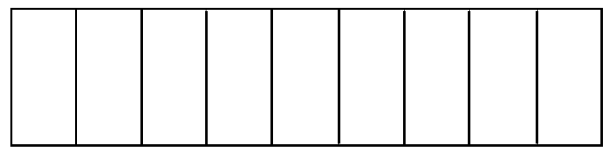

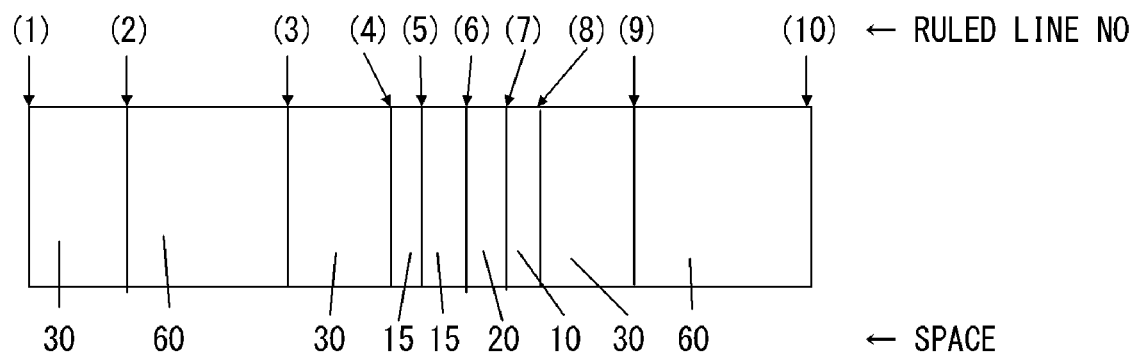
F I G. 1 1

|      | (1) | (2) | (3) | (4) | (5) | (6) | (7) | (8) | (9) | (10) |
|------|-----|-----|-----|-----|-----|-----|-----|-----|-----|------|
| (1)  | –   | –   | –   | –   | –   | –   | –   | –   | –   | –    |
| (2)  | 30  | –   | –   | –   | –   | –   | –   | –   | –   | –    |
| (3)  | 90  | 60  | –   | –   | –   | –   | –   | –   | –   | –    |
| (4)  | 120 | 90  | 30  | –   | –   | –   | –   | –   | –   | –    |
| (5)  | 135 | 105 | 45  | 15  | –   | –   | –   | –   | –   | –    |
| (6)  | 150 | 120 | 60  | 30  | 15  | –   | –   | –   | –   | –    |
| (7)  | 170 | 140 | 80  | 50  | 35  | 20  | –   | –   | –   | –    |
| (8)  | 180 | 150 | 90  | 60  | 45  | 30  | 10  | –   | –   | –    |
| (9)  | 210 | 180 | 120 | 90  | 75  | 60  | 40  | 30  | –   | –    |
| (10) | 270 | 240 | 180 | 150 | 135 | 120 | 110 | 90  | 60  | –    |

| | 10 | 15 | 20 | 30 | 35 | 40 | 45 | 50 | 60 | 70 | 75 | 80 | 90 | 105 | 110 | 120 | 135 | 140 | 150 | 170 | 180 | 210 | 240 | 270 |
|---|---|---|---|---|---|---|---|---|---|---|---|---|---|---|---|---|---|---|---|---|---|---|---|---|
| 1/1 | 1 | 2 | 1 | 5 | 1 | 1 | 2 | 1 | 6 | 1 | 1 | 1 | 1 | 5 | 1 | 1 | 4 | 2 | 1 | 3 | 1 | 3 | 1 | 1 |
| TOTAL | 1 | 2 | 1 | 5 | 1 | 1 | 2 | 1 | 6 | 1 | 1 | 1 | 1 | 5 | 1 | 1 | 4 | 2 | 1 | 3 | 1 | 3 | 1 | 1 |

FIG. 13B

| | 10 | 13 | 15 | 17 | 20 | 22 | 25 | 30 | 35 | 37 | 40 | 45 | 50 | 52 | 55 | 60 | 67 | 70 | 75 | 80 | 85 | 90 | 105 | 110 | 120 | 135 | 140 | 150 | 170 | 180 | 210 | 240 | 270 |
|---|---|---|---|---|---|---|---|---|---|---|---|---|---|---|---|---|---|---|---|---|---|---|---|---|---|---|---|---|---|---|---|---|---|
| 1/1 | | 1 | | 2 | | 1 | | 5 | 1 | | | | | | | 6 | | 1 | 1 | 1 | | 5 | 1 | 1 | | 2 | 1 | | 1 | 3 | 1 | | 1 |
| 1/2 | 2 | 10 | | | 2 | | 2 | 4 | | | 2 | 12 | | 2 | 2 | 8 | 4 | 2 | 6 | | 2 | 6 | | | 2 | 2 | | 3 | | | | 1 | |
| TOTAL | 3 | 10 | | 2 | 2 | 1 | 2 | 17 | 1 | | 2 | 12 | | 2 | 2 | 14 | 4 | 3 | 7 | 1 | 2 | 11 | 1 | 1 | 2 | 4 | 1 | 3 | 1 | 3 | 1 | 1 | 1 |

FIG. 13C

| | 10 | 11 | 13 | 15 | 16 | 17 | 20 | 22 | 23 | 25 | 26 | 30 | 35 | 36 | 37 | 40 | 45 | 46 | 50 | 52 | 55 | 56 | 60 | 67 | 70 | 75 | 80 | 85 | 90 | 105 | 110 | 120 | 135 | 140 | 150 | 170 | 180 | 210 | 240 | 270 |
|---|---|---|---|---|---|---|---|---|---|---|---|---|---|---|---|---|---|---|---|---|---|---|---|---|---|---|---|---|---|---|---|---|---|---|---|---|---|---|---|---|
| 1/1 | | 2 | | 1 | | | | | | | | 5 | 1 | | | | 2 | | | | 2 | | 6 | | 1 | 1 | 1 | | 5 | 1 | 1 | 4 | 2 | 1 | 3 | 1 | 3 | 1 | 1 | 1 |
| 1/2 | 2 | 10 | 10 | | 2 | | 4 | | | 2 | | 12 | | | 2 | | 10 | | | 2 | | 3 | 8 | 4 | 2 | 6 | | 2 | 6 | 2 | | 2 | 2 | | 3 | | | | | |
| 1/3 | 15 | | 3 | 6 | 3 | | 18 | | | 3 | | 15 | 3 | 3 | | 12 | 6 | 3 | 9 | | 2 | 3 | 9 | | 3 | | 3 | | 3 | | | | | 1 | | 1 | 3 | 1 | | 1 |
| TOTAL | 18 | 3 | 13 | 18 | 3 | 2 | 21 | | | 5 | 3 | 32 | 4 | 3 | | 14 | 18 | 3 | 10 | 3 | 2 | 3 | 23 | 4 | 6 | 7 | 4 | 2 | 14 | 3 | 1 | 6 | 4 | 2 | 14 | 3 | 3 | 1 | 1 | 1 |

CHARACTER RECOGNITION DEVICE

FIELD OF THE INVENTION

The embodiment discussed herein is related to a character recognition device for recognizing a character in the character frame of a form.

BACKGROUND OF THE INVENTION

Generally, a character recognition device reads a handwritten or printed character as color image data and recognizes the character by collating the color image data with a pre-registered character pattern.

When recognizing a character in the character frame of some form, such a character recognition device specified a character frame and then recognizes a character from the color image data of the form left after eliminating the specified character frame.

When specifying a character frame, it is necessary for the operator to register character frame information (for example, the shape, color and the like of a character frame) in advance (for example, see Japanese Patent Laid-open Publication No. 61-253587).

There is also a character recognition device for recognizing a character left after eliminating drop-out color at the time of character recognition, using drop-out color for the character frame of a form. In this case, since information about the drop-out color is already registered in the character recognition device, there is no need for the operator to register character frame information.

However, when the operator registers character frame information in advance, usually it is necessary for the operator to specify the shape, color or the like of a character frame by operating a mouse, keyboard or the like while watching the color image data of a form on a display and thereby the work man-hours of the operator increase.

When using drop-out color for a character frame, a character in a character frame using other color than the drop-out color cannot be recognized.

SUMMARY OF THE INVENTION

The object of the present invention is to provide a character recognition device capable of reducing the work man-hours of the operator at the time of character recognition and also preventing color used for a character frame from being restricted.

In order to solve the above-described problems, the present invention adopts the following configuration.

Specifically, according to the present invention, a character recognition device includes an image reading unit for reading a form as first color image data, a display unit for displaying the first color image data, an analysis range specification unit for extracting second color image data corresponding to the analysis range specified by the operator from the first color image data displayed on the display unit, a first line segment extraction unit for extracting a line segment from the second color image data on the basis of data having linearity, in the second color image data, a background elimination unit for eliminating background from the second color image data to generate third color image data, a first ruled line extraction unit for extracting the representative color of the line segment extracted by the first line segment extraction unit from the third color image data, integrating line segments of the same color as the representative color and extracting a ruled line, a separation unit for eliminating the ruled line extracted by the first ruled line extraction unit, from the third color image data and separating a character from a character frame, a second line segment extraction unit for extracting a line segment from the third color image data on the basis of the data having linearity in the third color image data and the color of the character frame separated by the separation unit, a second ruled line extraction unit for extracting a ruled line from the third color image data on the basis of the line segment extracted by the second line segment extraction unit, a character frame specification unit for specifying a character frame on the basis of the ruled line extracted by the second ruled line extraction unit and the shape pattern of a character frame, registered in advance, a first character frame elimination unit for eliminating the character frame from the third color image data while leaving the overlap of a character and a character frame on the basis of the color of the character separated by the separation unit and the color of the character frame specified by the character frame specification unit and extracting the character, and a character recognition unit for recognizing the character extracted by the first character frame elimination unit.

The second ruled line extraction unit can also include a third ruled line extraction unit for extracting line segments of the same color as the representative color of the line segment extracted by the second line segment extraction unit, from the third color image data, integrating the extracted line segments and extracting a ruled line, a specification unit for specifying a place still in a connection relationship, of the ruled line extracted by the third ruled line extraction unit and a connection unit for determining whether the place can be connected, on the basis of the edge component of the place specified by the specification unit, and if it is determined that the place can be connected, connecting the place and extracting a ruled line.

The character frame specification unit can also include a space table generation unit for calculating the space of two arbitrary vertical lines in each of all the combinations in the case where the two arbitrary vertical lines are selected from respective vertical lines of the rule line extracted by the second ruled line extraction unit and generating a space table indicating the calculated space, a vote table generation unit for generating a vote table indicating the total number of spaces displayed in the space table, a space assumption unit for assuming a space whose total number indicated in the vote table is large to be the space of the character frame, a space modification unit for modifying the space of the shape pattern of the character frame to the space assumed by the space assumption unit and a specification unit for matching the shape pattern of the character frame whose space is modified by the space modification unit with the pattern of the ruled line extracted by the second ruled line extraction unit and specifying a character frame by the result of the pattern matching.

The character recognition device of the present invention can also include a second character frame elimination unit for eliminating the character frame specified according to character frame information registered by the operator in advance from the third color image data and extracting a character, and can reflect character frame information corresponding to the character frame specified by the character frame specification unit in the character frame information registered by the operator.

The character frame specification device of the present invention specifies a character frame in a form and includes a line segment extracting unit for extracting a line segment corresponding to a character frame from the image data of the form, a space table generation unit for calculating the space of two arbitrary vertical lines in each of all the combinations in the case where the two arbitrary vertical lines are selected from respective vertical lines of the line segment extracted by the line segment extraction unit and generating a space table indicating the calculated spaces, a vote table generation unit for generating a vote table indicating the total number of spaces displayed in the space table, a space assumption unit for assuming a space whose total number indicated in the vote table is large to be the space of the character frame, a space modification unit for modifying the space of the shape pattern of the character frame registered in advance to the space assumed by the space assumption unit and a specification unit for matching the shape pattern of the character frame whose space is modified by the space modification unit with the line segment extracted by the line segment extraction unit and specifying a character frame by the result of the pattern matching.

According to the present invention, when the character recognition device recognizes a character in a character frame in a form, the work man-hours of the operator can be reduced and also color used for the character frame of a form can be prevented from being restricted.

BRIEF DESCRIPTION OF DRAWINGS

FIG. 2 illustrates a flowchart for explain the operation of the character recognition device;

FIG. 4 illustrates the color of the overlap of a character and a character frame;

FIG. 6 illustrates a relationship between the color image data of a 0.1 mm character frame in the resolution of 240 dpi and RGB information;

FIG. 8A explains a ruled line extraction method using an edge component No. 1);

FIG. 8B explains a ruled line extraction method using an edge component No. 2);

FIG. 8C explains a ruled line extraction method using an edge component No. 3);

FIG. 8D explains a ruled line extraction method using an edge component No. 4);

FIG. 8E explains a ruled line extraction method using an edge component No. 5);

FIG. 9A explains the concept of a character frame specification method (No. 1);

FIG. 9B explains the concept of a character frame specification method (No. 2);

FIG. 9C explains the concept of a character frame specification method (No. 3);

FIG. 9D explains the concept of a character frame specification method (No. 4);

FIG. 11 illustrates one example of a space between respective vertical lines after line segment extraction;

FIG. 12 illustrates one example of a space table;

FIG. 13A illustrates one example of a vote table (No. 1);

FIG. 13B illustrates one example of a vote table (No. 2);

FIG. 13C illustrates one example of a vote table (No. 3);

DESCRIPTION OF EMBODIMENTS

Preferred embodiments of the present invention will be explained with reference to accompanying drawings.

Figure 1:
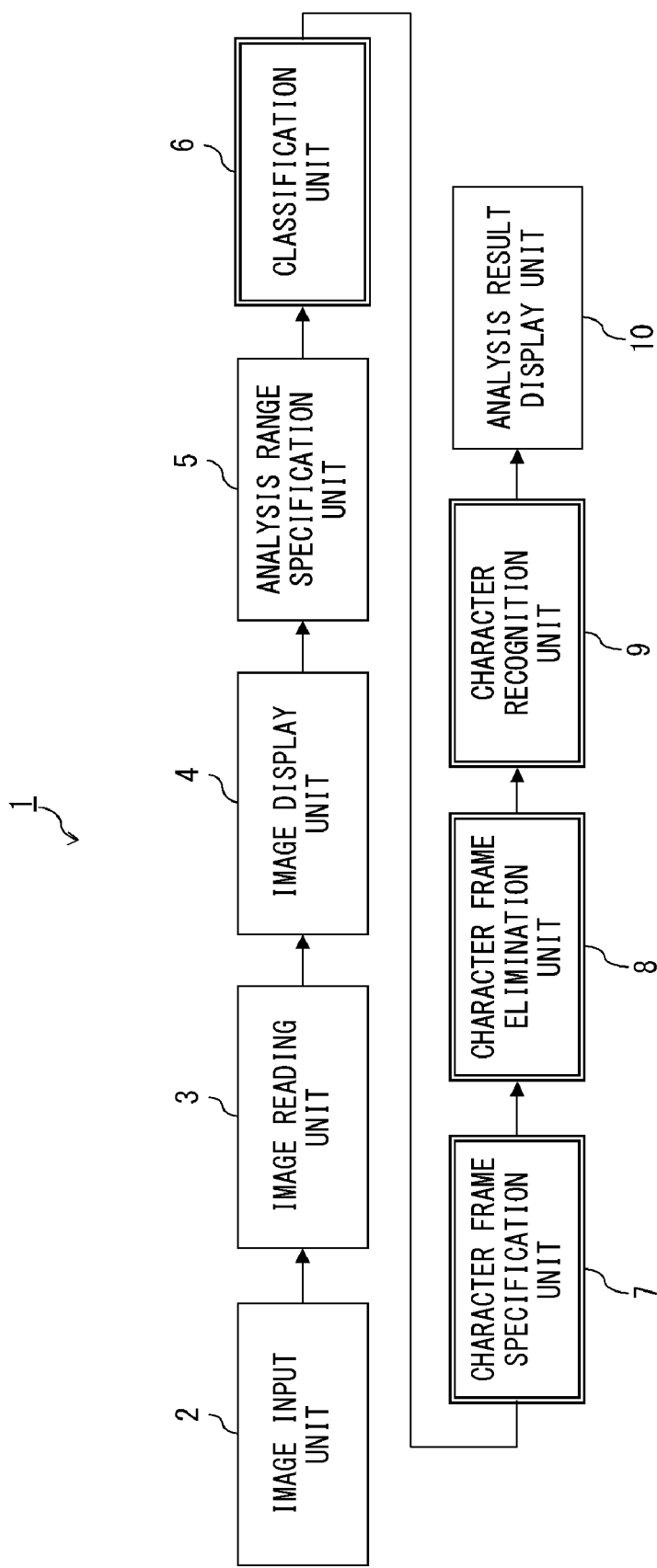
FIG. 1 illustrates a character recognition device in the preferred embodiment of the present invention.

FIG. 1 illustrates a character recognition device in the preferred embodiment of the present invention.

A character recognition device 1 illustrated in FIG. 1 includes an image input unit 2, an image reading unit 3, an image display unit 4, an analysis range specification unit 5, a classification unit 6, a character frame specification unit 7, a character frame elimination unit 8, a character recognition unit 9 and an analysis result display unit 10.

FIG. 2 illustrates a flowchart for explain the operation of the character recognition device 1.

Firstly, the image reading unit 3 reads a form inputted from the image input unit 2, such as a scanner or the like as color image data (first color image data) (hereinafter simply called form)(S1).

Figure 3A:
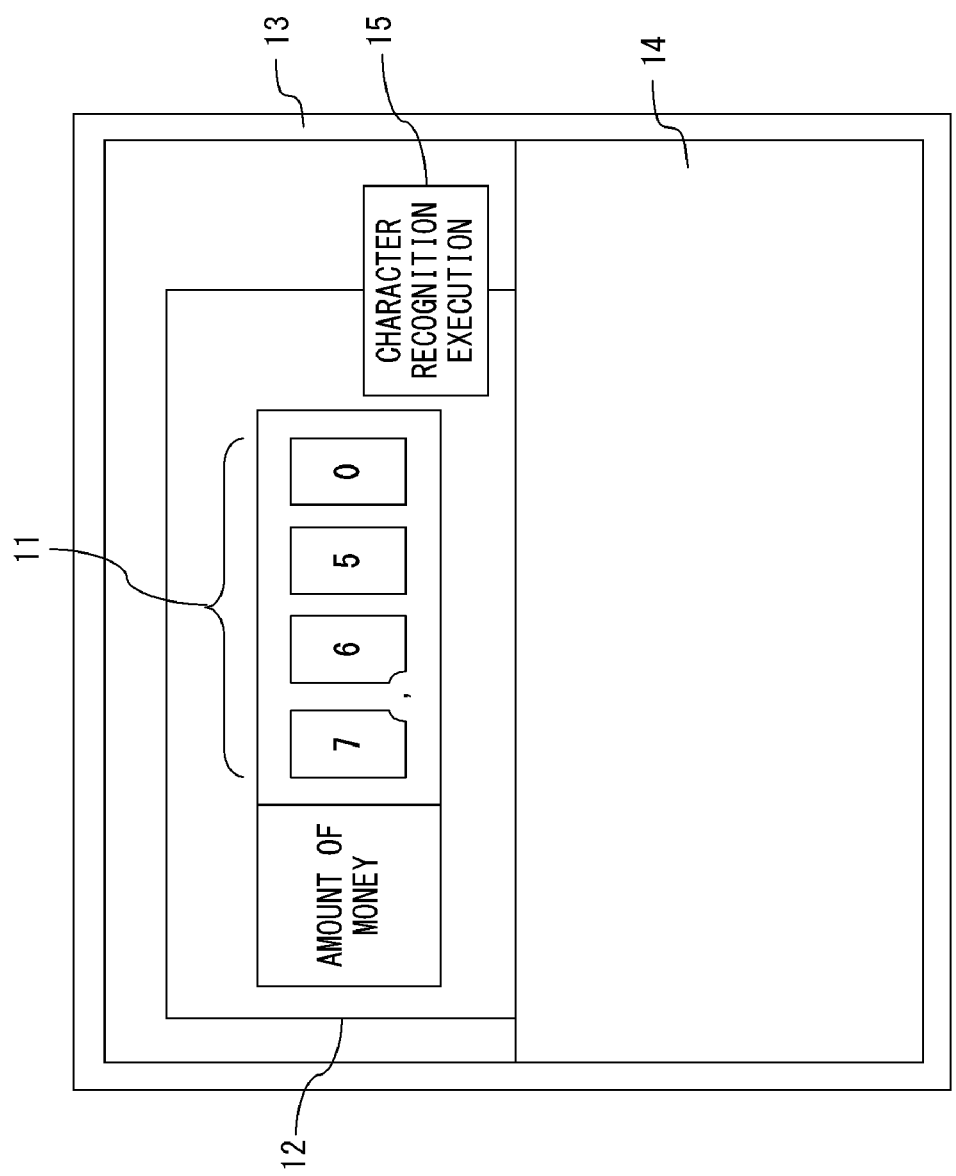
FIG. 3A illustrates an example of the display screen of the color image data of a form (No. 1)

Then, the image display unit 4 displays the form read by the image reading unit 3 on a display (S2). In the example illustrated in FIG. 3A, a form 12 indicating a character frame 11 capable of describing a four-digit amount of money is displayed on the upper half of the display 13 and a result display field 14 indicating the recognition result of a character and the analysis result of a character frame is displayed on the lower half of the display 13. In the example illustrated in FIG. 3A, a "character recognition execution" button 15 is displayed on the display 13, and when the operator pushes the "character recognition execution" button 15 by the operation of a mouse, keyboard or the like, character frame analysis and character recognition is started.

Figure 3B:
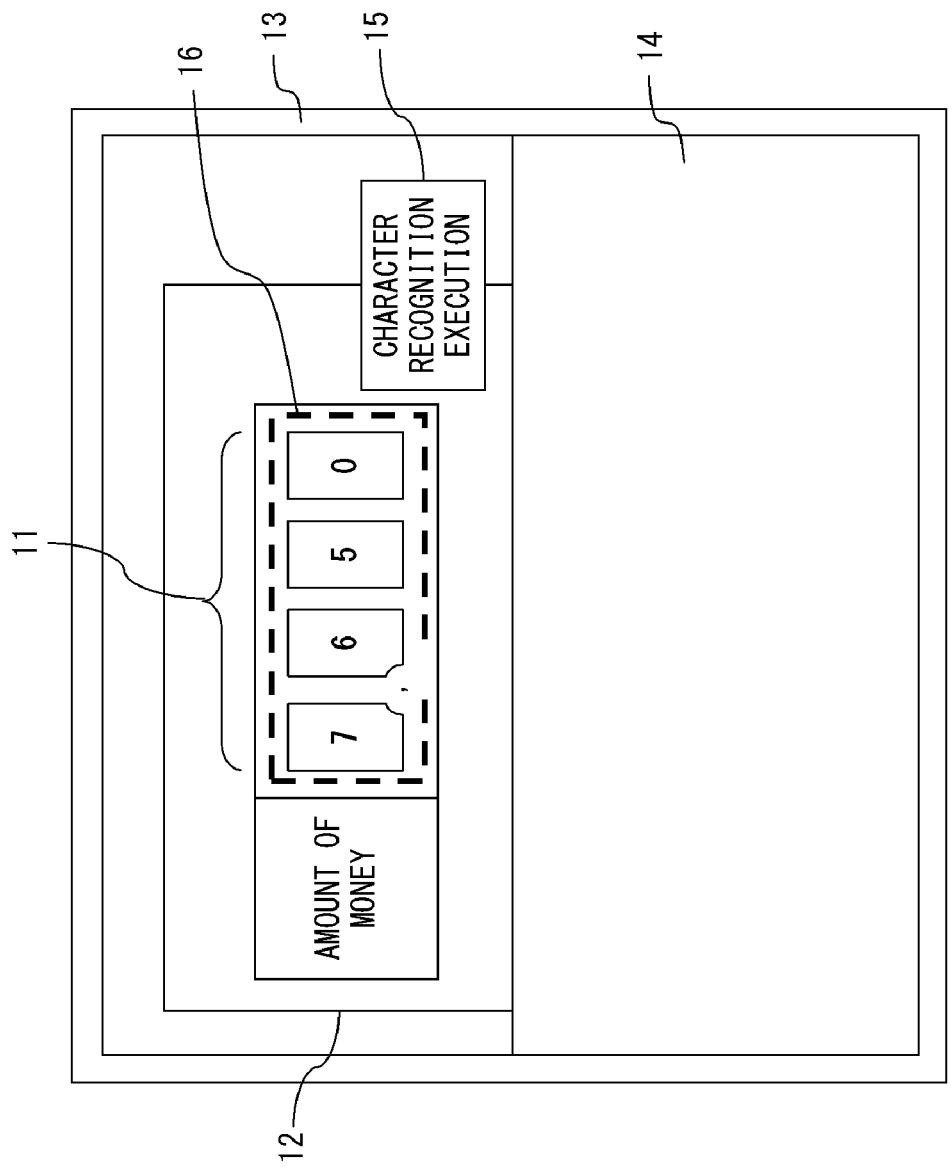
FIG. 3B illustrates an example of the display screen of the color image data of a form (No. 2)

Then, the analysis range specification unit 5 reads the color image data in an analysis range specified by the operator (second color image data) (hereinafter simply called analysis range) in the form displayed on the display 13 (S3). For example, as illustrated in FIG. 3B, the operator roughly adjusts the position and size of the analysis range 16 in such a way as to put at least the character frame 11 within the analysis range 16 by operating a mouse, keyboard or the like while watching the form 12 displayed on the display 13.

Then, the classification unit 6 extracts a line segment (a line segment constituting a character frame, a line segment constituting a character and line segments (noise, etc.) other than the line segments constituting the character frame and the character from the analysis range on the basis of data having linearity in the analysis range read in S3 (S4: line segment primary extraction).

Then, the classification unit 6 eliminates color image data (hereinafter simply called background) corresponding to background color (for example, the most color in the analysis range in line segments other than the line segment extracted in S4) from the analysis range other than the line segment extracted in S4 (S5).

Then, the classification unit 6 extracts the line segments of representative color (for example, the most color in the line segment in the color image data from which background is eliminated), of the line segments extracted in S4 from the color image data (third color image data) from which background is eliminated in S5, integrates the extracted line segments and extracts a ruled line (S6: ruled line primary extraction). Thus, by integrating the line segments of the representative color and extracting a ruled line, the influence of color deviation caused by color variations for each scanner and the change of scanner power source can be suppressed. This ruled line includes a part of a character.

Then, the classification unit 6 extracts a cell (rectangle) from the riled line extracted in S6 (S7). This cell also includes a part of a character.

Then, the classification unit 6 temporarily determines a character frame using the ruled line extracted in S6 or the cell extracted in S7, eliminates the temporarily determined character frame from the color image data from which background is eliminated in S5 (S8) and roughly classifies the analysis range into background, a character frame and a character (S9). The part of the character classified then is eliminated.

Then, the character frame specification unit 7 extracts a line segment constituting a character frame from the color image data from which background is eliminated in S5 using data having linearity in the color image data from which background is eliminated and the color of the character frame classified in S9 (S10: line segment secondary extraction).

Then, the character frame specification unit 7 extracts a ruled line on the basis of the line segment extracted in S10 (S11: ruled line secondary extraction).

Then, the character frame specification unit 7 specifies a character frame in the analysis range as one of a simple frame, a ladder frame and one character frame by the ruled line extracted in S11 and a cell based on the rule line (S12).

Then, the character frame elimination unit 8 eliminates a character frame from the color image data from which background is eliminated in S5 and extracts a character while leaving the overlap of a character and a character frame, on the basis of the color of the character classified in S9 and the color of the character frame specified in S12 (S13). For example, as illustrated in FIG. 4, since the color of the overlap of the character classified in S9 and the character frame specified in S12 differs from the color of a character or the color of a character frame, only a character can be extracted by eliminating the color image data of the color of the character frame specified in S12 from the color image data from which background color is eliminated in S5 while leaving the color of the overlap.

Then, the character recognition unit 9 recognizes the character extracted in S13 (S14). For example, a character can be recognized by the existing character recognition technology capable of recognizing a hand-written or printed character. Alternatively, the attribute of a character is registered in advance and a character can be recognized on the basis of the attribute of the character.

Then, the analysis result display unit 10 displays the character (character recognition result) recognized in S14 and the character frame information (the shape pattern of a character frame, the color of a character frame, the line type of a character frame, the thickness of a character frame, the number of frames of a character frame, the size of a character frame and the coordinates of a character frame) of the character frame specified in S12 on a display (S15). In the example illustrated in FIG. 5, a character recognition result, the shape pattern of a character frame, the color of a character frame, the line type of a character frame, the thickness of a character frame, the number of frames of a character frame, the size of a character frame and the coordinates of a character frame are indicated as 7650, one character frame, black, solid line, 1 mm, 4, as illustrated and as illustrated, respectively, in the result display field 14 displayed on the display 13.

As described above, since the character recognition device 1 in this preferred embodiment firstly roughly classifies an analysis range specified by the operator of the color image data of a form into background, a character frame and a character, precisely specifies a character frame on the basis of the classification result, eliminates the specified character frame from the color image data from which background is eliminated and recognizes the remaining character, the accuracy of the character recognition in a character frame can be improved. Thus, since there is no need for the operator to register character frame information in advance, the work man-hours of the operator at the time of character recognition can be reduced.

Since the character recognition device 1 in this preferred embodiment specifies a character frame on the basis of the color image data of a form, no color used for a character frame is restricted.

However, when the resolution of a scanner for reading the color image data of a form is 240 dpi and also the thickness of a character frame in the form is 0.1 mm, the color image data of the character frame becomes 1dot unit. Therefore, the color image data of the character frame between the CCD cameras of the scanner cannot be read and it is difficult to extract all the ruled lines only by representative color as in S6.

Thus, since the color image data of a 0.1 mm character frame in such 240 dpi resolution reacts to either piece of information of RGB, as illustrated in FIG. 6, it can be considered to extract a ruled line using an edge component.

Figure 7:
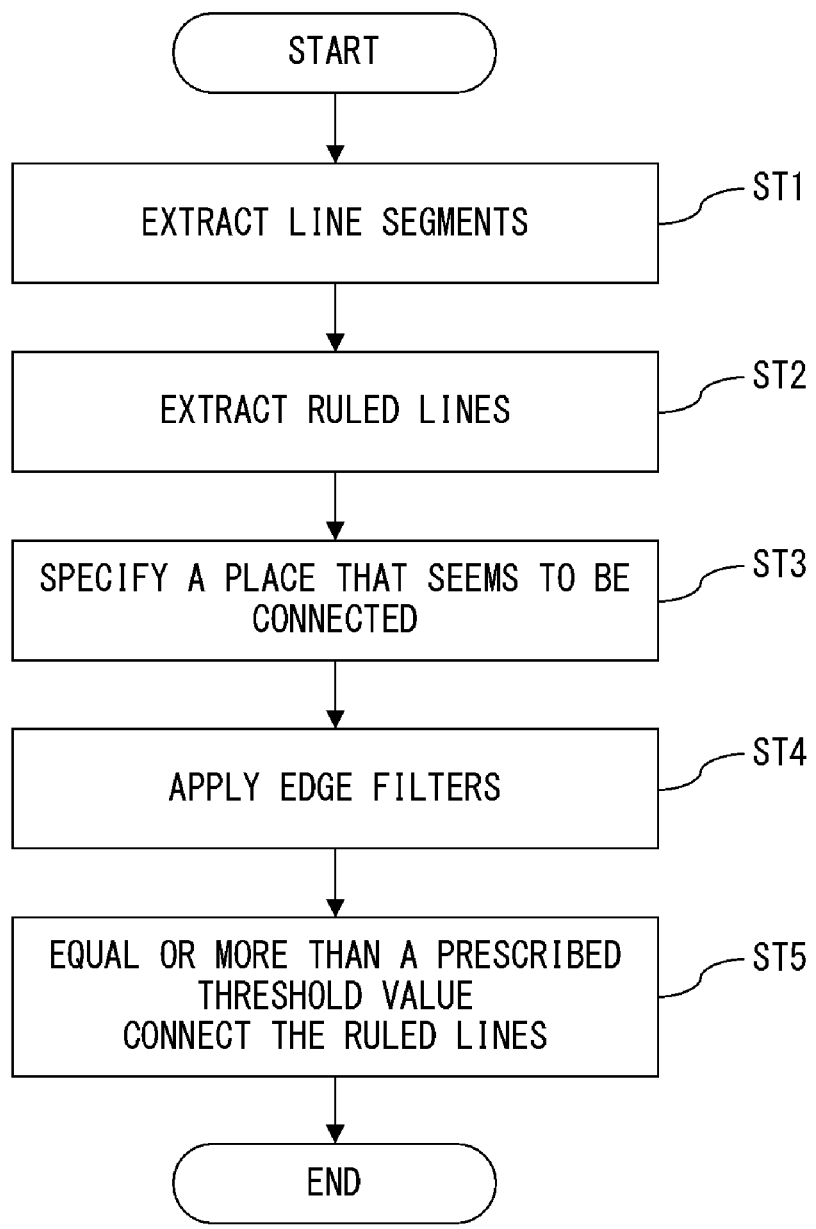
FIG. 7 illustrates a flowchart for explaining a ruled line extraction method using an edge component.

FIG. 7 illustrates a flowchart for explaining a ruled line extraction method using an edge component.

Firstly, as illustrated in FIG. 8A, a line segment is extracted from the analysis range specified by the operator, of the color image data of a form read by a scanner or the like (ST1). For example, as in S4 of FIG. 2, a line segment constituting a character frame, a line segment (a line segment constituting a character and line segment (noise) other than lines constituting a character frame and a character) are extracted from the analysis range on the basis of data having linearity in the analysis range.

Then, as illustrated in FIG. 8B, the line segments of representative color are extracted from the line segments extracted in ST\Y, the extracted line segments are integrated and a ruled line is extracted (ST2).

Then, as illustrated in FIG. 8C, a place that seems to be still in a connection relationship (broken line circle) of the ruled lines extracted in ST2 is specified (ST3). For example, a place that seems to be still connected is specified on the basis of the position, color, thickness, direction and the like of the ruled line extracted in ST2.

Then, as illustrated in the enlargement of the broken line circle of FIG. 8D, edge filters are applied to the place specified in ST3 (ST4).

Then, as illustrated in FIG. 8E, when the gradation difference of color image data after the application of edge filters in the place specified in ST3 is equal or more than a prescribed threshold value, the color image data is integrated and a final ruled line is extracted (ST5).

According to the ruled line extraction method illustrated in FIG. 7, even when the resolution of a scanner 240 dpi and the thickness of a character frame is 0.1 mm, a ruled line corresponding to the character frame can be extracted accurately.

The ruled line extraction method illustrated in FIG. 7 can also be used when extracting a ruled line in S11 of FIG. 2. Specifically, firstly, in ST2 of FIG. 7, the line segments extracted in S10 of FIG. 2 can be also integrated and ruled lines can be also extracted. Then, in ST3 of FIG. 7, a place that seems to be still connected, of the extracted ruled lines can be also specified. Then, in ST4 of FIG. 7, edge filters can also be applied to the place specified in ST3. Then, in ST5 of FIG. 7, when the gradation difference of color image data after the application of edge filters is equal or more than a prescribed threshold value, the color image data can also be integrated and a ruled line can also be extracted. Then, in S11 of FIG. 2, a character frame can also be specified on the basis of the extracted ruled line.

Furthermore, for example, when a ruled line cannot be extracted satisfactorily since a character frame is thin, when a ruled line cannot be extracted satisfactorily since a character frame is a dotted line, when a ruled line cannot be extracted satisfactorily since the color of a character described in a character frame is the same as the color of the character frame, when a ruled line corresponding to the decorated character frame cannot be extracted satisfactorily, when a ruled line cannot be extracted satisfactorily since space between the vertical lines of a character frame is not equal and the like, a character frame cannot be specified satisfactorily as one of a simple frame, a ladder frame and one-character frame.

Therefore, when a character frame cannot specified satisfactorily thus, for example, firstly, a ruled line can be extracted from the color image of a form as illustrated in FIG. 9A (FIG. 9B), then, a space the total number of which between the vertical lines of the ruled line is many can be assumed to be each space between respective vertical lines (FIG. 9C; one-point chain line: vertical line after extrapolation, broken line: vertical line after deletion), then, each space between the respective vertical lines of a character frame registered in advance is transformed into the assumed space and a character frame can be specified on the basis of the result of matching between the character frame and the ruled line (FIG. 9D).

Figure 10:
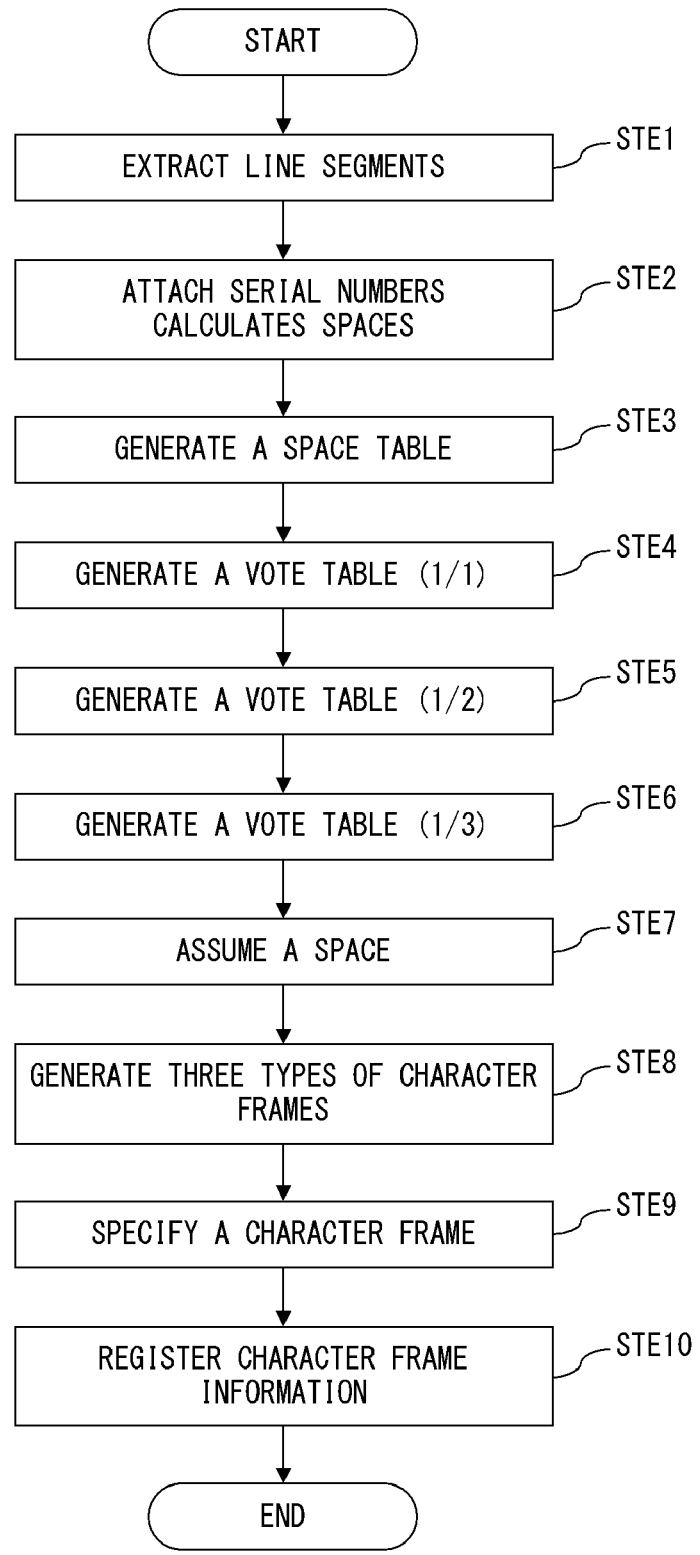
FIG. 10 illustrates a flowchart for explaining the character frame specification method.

FIG. 10 illustrates a flowchart for explaining such a character frame specification method.

Firstly, line segments are extracted from the analysis range specified by the operator, in the color image data of a form read by a scanner or the like (STE1).

Then, serial numbers are attached to the respective vertical lines of the line segment extracted in STE1 and also each space (dot) between the respective vertical lines is calculated (STE2). For example, as illustrated in FIG. 11, each of the serial numbers ((1) through (10)) to each of ten vertical lines of the line segments extracted in STE1. In the example illustrated in FIG. 11 a space between (1) and (2), a space between (2) and (3), a space between (3) and (4), a space between (4) and (5), a space between (5) and (6), a space between (6) and (7), a space between (7) and (8), a space between (8) and (9) and a space between (9) and (10) are calculated to be 30, 60, 30, 15, 15, 20, 10, 30 and 60, respectively.

Then, a space between two arbitrary vertical lines of each of all the combinations in the case two arbitrary vertical lines are selected from the respective vertical lines is calculated on the basis of each space calculated in STE2 and a space table indicating the calculated spaces is generated (STE3). A space table corresponding to the respective vertical lines (1) through (10) illustrated in FIG. 11 becomes, for example, a space table as illustrated in FIG. 12. In the space table illustrated in FIG. 12, for example, the numerical figure of the intersection between "(1)" in the top row and "(2)" in the utmost left row indicates a space between vertical line (2) and vertical line (1) as the reference, and the numerical figure of the intersection between "(3)" in the top row and "(8)" in the utmost left row indicates a space between vertical line (8) and vertical line (3) as the reference.

Then, a vote table is generated by casting one vote to a value obtained by counting each space in the space table generated in STE3 as it is (1/1) as one. A vote table corresponding to respective vertical lines (1) through (10) illustrated in FIG. 11 becomes, for example, a vote table illustrated in FIG. 13A. Each space of the space table illustrated in FIG. 12 is indicated in the top row of the vote table illustrated in FIG. 13A and "1/1" and the total number of votes in the utmost left column. Specifically, according to the vote table illustrated in FIG. 13A, the number of votes corresponding to a space of "30" is 5.

Then, a value obtained by dividing each space in the space table generated in STE3 by 2 (1/2) is counted as one (two votes cast at one time) and its number of votes is added to the vote table generated in STE4 (STE5). When a value obtained by dividing each space in the space table generated in STE3 by 2 (1/2) cannot be impossible as the space of a character frame, there is no vote. The vote table generated in STE5 becomes, for example, a vote table illustrated in FIG. 13B. In the vote table illustrated in FIG. 13B, each space of the space table illustrated in FIG. 12 and the values obtained by the spaces by 2 (1/2) are indicated in the top row and "1/1", "1/2" and the total number of votes are indicated in the leftmost column. Specifically, according to the vote table illustrated in FIG. 13B, for example, 17 votes are cast for a space "30".

Then, a value obtained by dividing each space in the space table generated in STE3 by 3 (1/3) is counted as one (three votes cast at one time) and its number of votes is added to the total number of votes in the vote table generated in STE5 (STE6). When a value obtained by dividing each space in the space table generated in STE3 by 3 (1/3) cannot be impossible as the space of a character frame, there is no vote. The vote table generated in STE6 becomes, for example, a vote table illustrated in FIG. 13C. In the vote table illustrated in FIG. 13C, each space of the space table illustrated in FIG. 12, a space obtained by dividing each space by 2 (1/2) and a space obtained by dividing each space by 3 (1/3) are indicated in the top row and "1/1", "1/2", "1/3" and the total number of votes are indicated in the leftmost column. Specifically, according to the vote table illustrated in FIG. 13C, for example, 32 votes are cast for a space "30". Although in this preferred embodiment, each space in the space table generated in STE3 is divided three times (substantially two times), the number of division of each space in the space table generated in STE3 is not especially limited.

Then, a space having the most total of the number of votes in the vote table generated in STE6 is assumed to be the space of the character frame (STE7). Foe example, as illustrated in FIG. 9A, in the case of a ladder frame each space between respective vertical lines of which is equal, "30" the total of the number of votes is most in the vote table generated in STE6 is specified as the space of the character frame. In the case of one-character frame and a combination of different character frames of space, a space the total of the number of votes of which is most or second most in the vote table generated in STE6 is assumed as the space of the character frame.

Figure 14A:
FIG. 14A illustrates one example of the shape pattern of a character frame (No. 1)
Figure 14B:
FIG. 14B illustrates one example of the shape pattern of a character frame (No. 2)
Figure 14C:
FIG. 14C illustrates one example of the shape pattern of a character frame (No. 3)
Figure 14D:
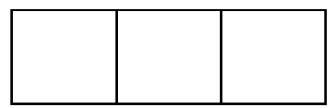
FIG. 14D illustrates one example of the shape pattern of a character frame (No. 4)
Figure 14E:
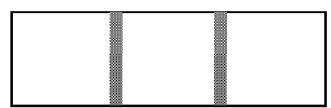
FIG. 14E illustrates one example of the shape pattern of a character frame (No. 5)
Figure 14F:
FIG. 14F illustrates one example of the shape pattern of a character frame (No. 6)
Figure 14G:
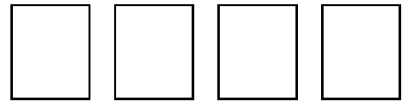
FIG. 14G illustrates one example of the shape pattern of a character frame (No. 7)
Figure 14H:
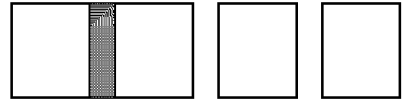
FIG. 14H illustrates one example of the shape pattern of a character frame (No. 8)
Figure 14I:
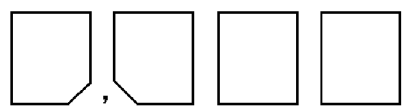
FIG. 14I illustrates one example of the shape pattern of a character frame (No. 9)

Then, the space between vertical lines in each shape pattern of three character frames of a simple frame, a ladder frame and one-character frame which are registered in advance is modified to the space assumed in STE7 and three types of character frames are generated (STE8). For example, as the shape pattern of a character frame, the basic shape of a simple frame illustrated in FIG. 14A, the variation 1 of a simple frame, illustrated in FIG. 14B (one without a top ruled line), the variation 2 of a simple frame, illustrated in FIG. 14C (one using a half ruled line), the basic shape of a ladder frame, illustrated in FIG. 14D, the variation 1 of a ladder frame, illustrated in FIG. 14E (one using a thick line), the variation 2 of a ladder frame, illustrated in FIG. 14F (one using a dotted line), the basic shape of one-character frame, illustrated in FIG. 14G, the variation 1 of one-character frame, illustrated in FIG. 14H (one obtained by combining the first and second character frames) and the variation 2 of one-character frame, illustrated in FIG. 14I (one in which the first and second character frames are transformed by a comma) and the like can be considered.

Then, the patterns of the line segments extracted in STE 1 and the three types of character frames generated in STE8 are matched and a character frame is specified on the basis of the result of the pattern matching (SRE9). For example, when the space of the respective vertical lines of a simple frame is modified to "30" as the shape pattern of a character frame, there is no partition line in the shape pattern of the character frame while there is a plurality of partition lines in the line segments extracted in STE1. Therefore, it is determined that the character frame is not a simple frame. When the space of the respective vertical lines of a ladder frame is assumed to "30" as the shape pattern of a character frame, the shape pattern of the character frame and the line segments extracted in STE1 are almost matched. Therefore, it is determined that it is a ladder frame. As illustrated in FIG. 9C, the insufficient vertical lines of the line segments extracted in STE1 are extrapolated, also extra vertical lines are deleted and a character frame is specified. When a character frame is specified thus, pattern matching is not applied to the one-character frame being the shape pattern of the remaining character frame and the line segments extracted in STE1. In the pattern matching between one-character frame as the shape pattern of a character frame and the line segments extracted in STE1 it can also be determined whether they are matched, on the basis of the regularity of each space between respective vertical lines.

Then, the character frame information (shape pattern, color, line type, thickness, number of frames, size and coordinates of a character frame) of the character frame specified in STE9 is registered and used when specifying a character frame next time (STE10).

According to the character frame specification method illustrated in FIG. 10, even when a ruled line cannot be extracted satisfactorily since a character frame is thin, even when a ruled line cannot be extracted satisfactorily since a character frame is a dotted line, even when a ruled line cannot be extracted satisfactorily since the color of a character described in a character frame is the same as the color of the character frame, even when a ruled line corresponding to a decorated character frame cannot be extracted satisfactorily, even when a ruled line cannot be extracted satisfactorily since spaces between the vertical lines of a character frame are not equal and the like, a character frame can be specified satisfactorily.

The character frame specification method illustrated in FIG. 10 can be also used when specifying a character frame in S12 of FIG. 2. Specifically, in STE2 of FIG. 10, serial numbers are attached to each vertical line of the ruled line extracted in S11 and also each space between the respective vertical lines is calculated. Then, after executing STE3 though STE8, in STE9, the patterns of the ruled lines extracted in S11 and three types of character frames generated in STE8 can also be matched and a character frame can also be specified on the result of the pattern matching.

The analysis result of the character frame obtained in S12 of FIG. 2 can also be reflected in character frame information registered in advance by the operator.

Figure 15:
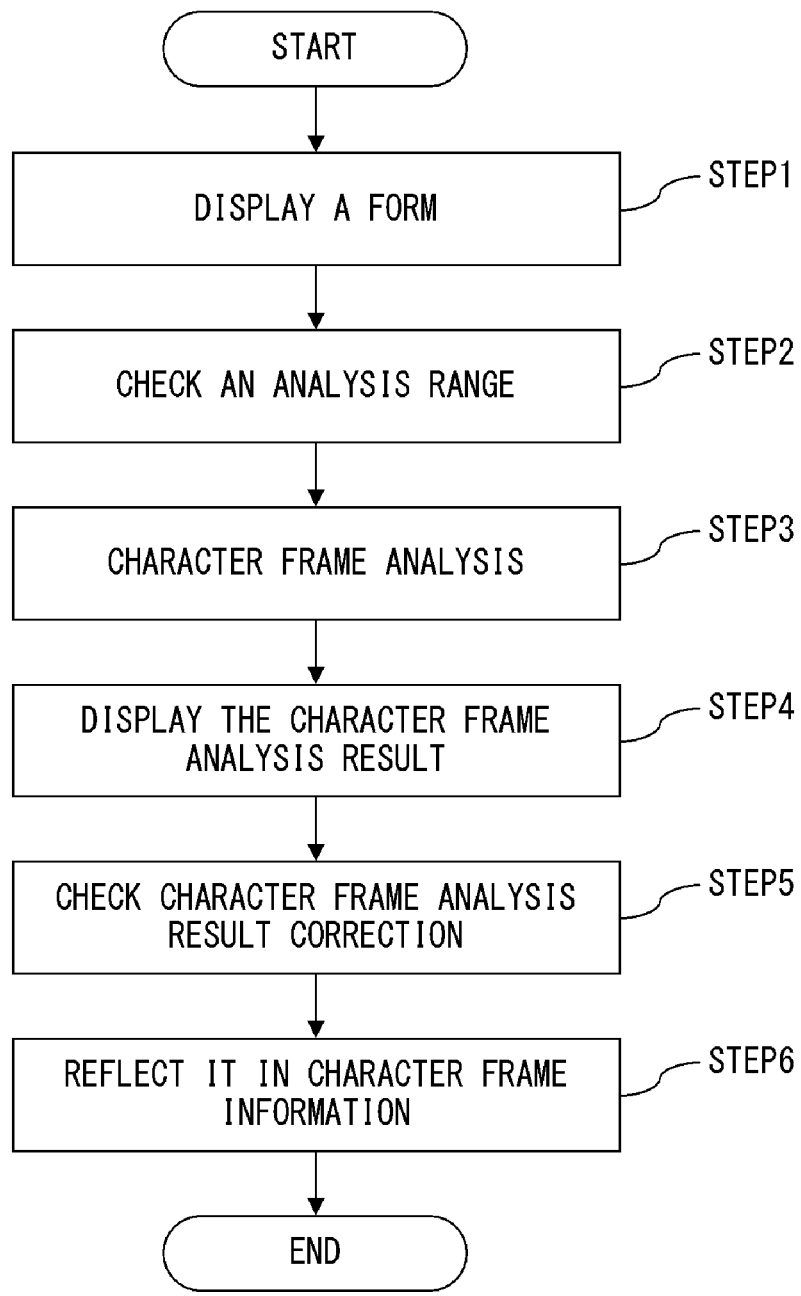
FIG. 15 illustrates a flowchart for explaining the operation in the case where the analysis result of a character frame is reflected in the character frame information registered in advance.

FIG. 15 illustrates a flowchart for explaining the operation of the character recognition device 1 in the case where the analysis result of a character frame obtained in S12 of FIG. 2 is reflected in the character frame information registered in advance by the operator. It is assumed that a function to recognize the remaining character after eliminating a character frame based on the character frame information registered in advance, from the color image data of a form from which background is eliminated is added to the character recognition device 1 for performing the operation of the flowchart illustrated in FIG. 15.

Firstly, the character recognition device 1 displays the color image data of a form read by a scanner or the like on a display (STEP1). For example, the color image data of a form is displayed on a display in a form definition tool for registering character frame information.

Then, the character recognition device 1 checks that an analysis range is specified in the color image data of a form displayed on a display by the mouse or keyboard operation of the operator or the like (STEP2). In this case, the operator roughly specifies an analysis range in such a way as to include al least a character frame to be analyzed.

Then, after checking that a character frame analysis execution button displayed on the display or the like is pushed by the by the mouse or keyboard operation of the operator, the character recognition device 1 analyzes the character frame in the analysis range specified in STEP2 (STEP3). In this case, it is assumed that the character frame is analyzed by executing S3 through S12 of FIG. 2.

Figure 5:
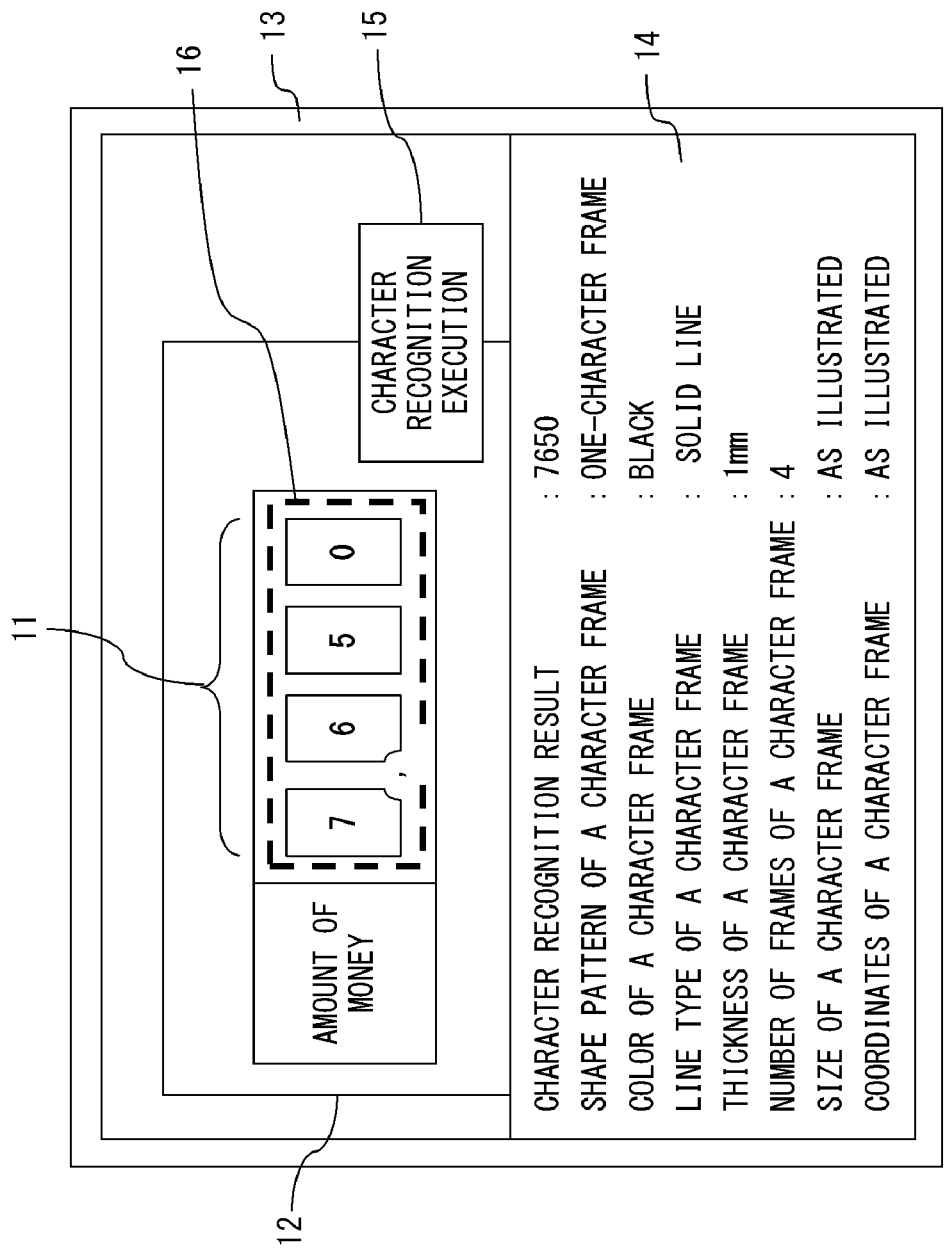
FIG. 5 illustrates an example of the display screen of a character recognition result and a character frame analysis result.

Then, the character recognition device 1 displays the character frame information being the analysis result of a character frame on the display (STEP4). For example, as illustrated in FIG. 5, the character frame information is displayed in the result display field 14 of the display 13.

Then, when the operator corrects the character frame information, the character recognition device 1 corrects the character frame information according to the correcting specification of the operator (STEP5). The operator checks whether the analysis result is correct, and when there is an error, the operator corrects the error by a mouse or keyboard operation. The operator can also add information other than the character frame information, such as a recognition category and the like.

Then, after it is checked that a definition storage button displayed on a display or the like is pushed by the mouse or keyboard operation of the operator, the character recognition device 1 reflects the character frame information obtained in STEP3 or the character frame information corrected in STEP5 in the character frame information registered in advance (STEP6).

Conventionally, when manually registers character frame information, the operator specified the character frame of the color image data of a form displayed on display on a form definition tool for registering character frame information by tracing it for each frame. Since the operator specified a character frame for each frame, it took much time to register character frame information. Furthermore, since a thin character frame was enlarged on a display once, so much time and effort were spent by it. Since the operator manually specifies a character frame, sometimes the specified analysis range and the real character frame are deviated and character frame information could not be registered.

The character recognition device 1 which operates according to the flowchart illustrated in FIG. 15, can automatically obtain character frame information simply by the operator roughly specifying an analysis range and prevent the above-described inconveniences from occurring.

The invention claimed is

1. A character recognition device, comprising:
an image reading unit for reading a form as first color image data;
a display unit for displaying the first color image data;
an analysis range specification unit for extracting second color image data corresponding to the analysis range specified by the operator from the first color image data displayed on the display unit;
a first line segment extraction unit for extracting a first line segment from the second color image data on the basis of data having linearity in the second color image data;
a background elimination unit for designating, as background, color image data corresponding to the greatest number of colors from among the second color image data other than the first line segment and for eliminating the background from the second color image data to generate third color image data;
a first ruled line extraction unit for extracting, from the third color image data, line segments of a representative color that exists more than any other colors in the third color image data, and for integrating the line segments so as to extract a first ruled line;
a classification unit for eliminating the first ruled line from the third color image data so as to extract a first character and for classifying the third color image data into the first character and a first character frame;
a second line segment extraction unit for extracting a second line segment from the third color image data on the basis of data having linearity in the third color image data and color of the first character frame;
a second ruled line extraction unit for extracting a second ruled line from the third color image data on the basis of the second line segment;
a character frame specification unit for specifying a second character frame on the basis of the second ruled line and a shape pattern of a character frame, registered in advance;
a first character frame elimination unit for eliminating the second character frame from the third color image data while leaving overlap of the first character and the second character frame on the basis of color of the first character and color of the second character frame so as to extract a second character; and
a character recognition unit for recognizing the second character;
wherein
said character frame specification unit comprises a space table generation unit for calculating a space between two arbitrary vertical lines in each of all combinations in the case where the two arbitrary vertical lines are selected from respective vertical lines of the second ruled lines and generating a space table indicating the calculated spaces,
a vote table generation unit for counting the number of spaces which are the same from among the spaces indicated in the space table, and for generating a vote table indicating the total count value for each of the spaces,
a space assumption unit for assuming a space whose total count value indicated in the vote table is largest as a space of the character frame,
a space modification unit for modifying the or each space in a shape pattern of the character frame to the space assumed by the space assumption unit and
a specification unit for matching the shape pattern of a character frame whose space has been modified by the space modification unit with a pattern of the second ruled line and for specifying the second character frame on the basis of a result of the pattern matching.

2. The character recognition device according to claim 1, wherein
said second ruled line extraction unit comprises
a third ruled line extraction unit for integrating the second line segment so as to extract a third ruled line,
a specification unit for specifying a place that seems to be connected, in the third ruled line and
a connection unit for determining whether the place can be connected, on the basis of an edge component of a place specified by the specification unit and for connecting the place and extract the second ruled line, if it is determined that the place can be connected.

3. The character recognition device according to claim 1, further comprising
a second character frame elimination unit for eliminating a character frame specified according to character frame information registered in advance by an operator from the third color image data and extracting a character, wherein
character frame information corresponding to a character frame specified by the character frame specification unit is reflected in the character frame information registered by an operator.

* * * * *